United States Patent [19]
Baker

[11] 3,713,282
[45] *Jan. 30, 1973

[54] HARVESTING APPARATUS

[76] Inventor: Alfred R. Baker, 1408½ Edmiston Court, Auburndale, Fla. 33823

[*] Notice: The portion of the term of this patent subsequent to Feb. 9, 1988, has been disclaimed.

[22] Filed: Nov. 4, 1970

[21] Appl. No.: 86,888

Related U.S. Application Data

[63] Continuation-in-part of Ser. No. 735,116, June 6, 1968, Pat. No. 3,561,205.

[52] U.S. Cl. ............................................. 56/328 R
[51] Int. Cl. ............................................. A01g 19/04
[58] Field of Search ......................... 56/328 R, 337

[56] References Cited

UNITED STATES PATENTS

| 3,561,205 | 2/1971 | Baker | 56/328 R |
| 3,401,514 | 9/1968 | Clark | 56/328 R |
| 3,389,543 | 6/1968 | Clark | 56/337 |

Primary Examiner—Louis G. Mancene
Assistant Examiner—J. N. Eskovitz
Attorney—Clarence A. O'Brien and Harvey B. Jacobson

[57] ABSTRACT

A harvesting or picking head incorporating a pair of interested sections mounted for reciprocation relative to each other. Each of the sections includes plural rows of projecting rods which coact with the rods of the other section so as to effect a snapping of the stems of mature fruit and a gentle movement of the severed fruit to a common collection point.

8 Claims, 14 Drawing Figures

PATENTED JAN 30 1973

Alfred R. Baker
INVENTOR.

BY Clarence A. O'Brien
and Harvey B. Jacobson
Attorneys

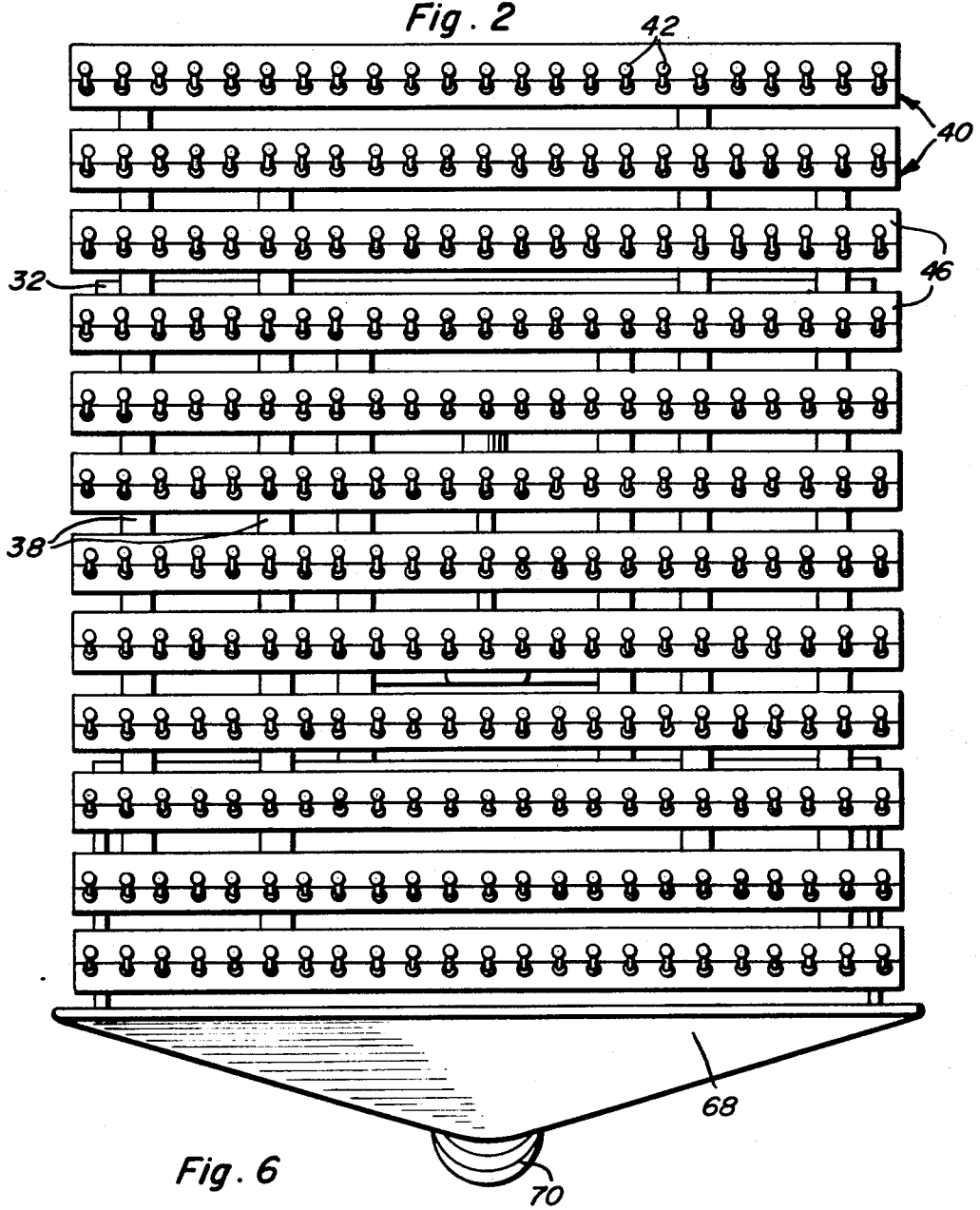
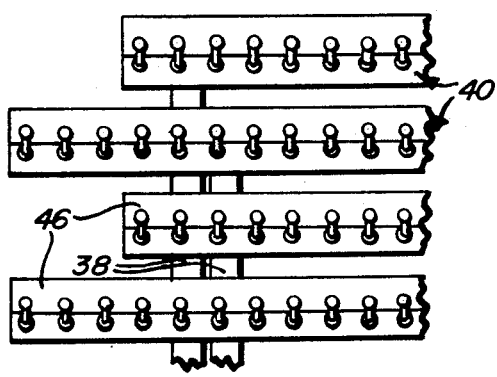

Alfred R. Baker
INVENTOR.

BY Clarence A. O'Brien
and Harvey B. Jacobson
Attorneys

Alfred R. Baker
INVENTOR.

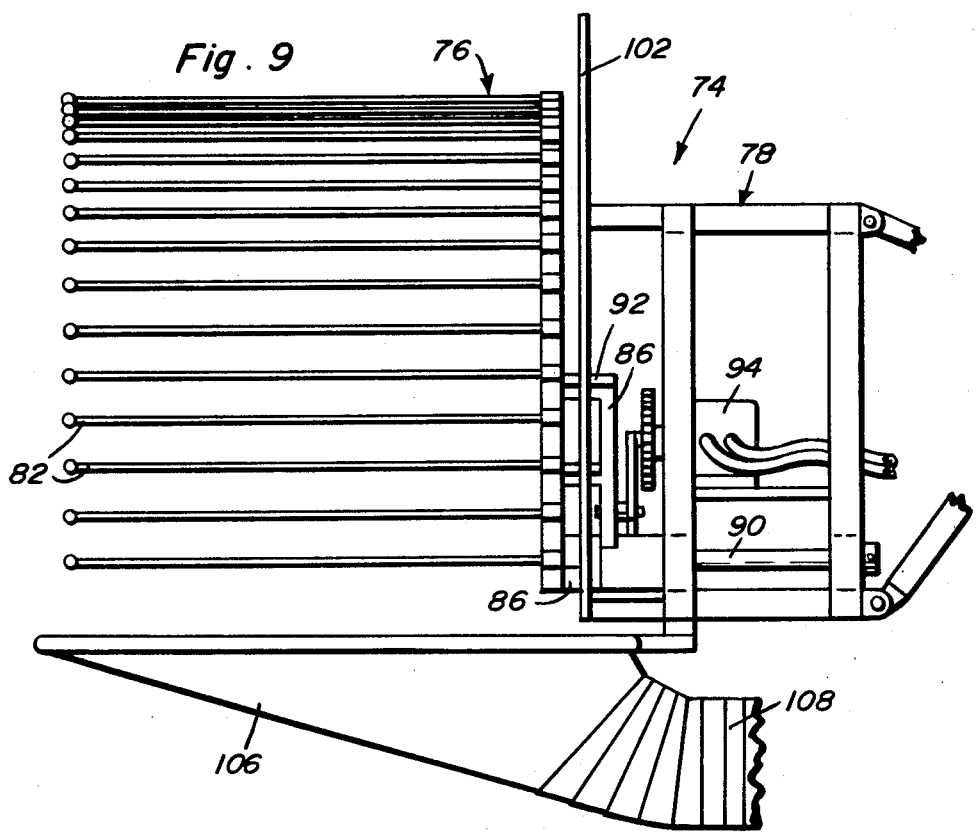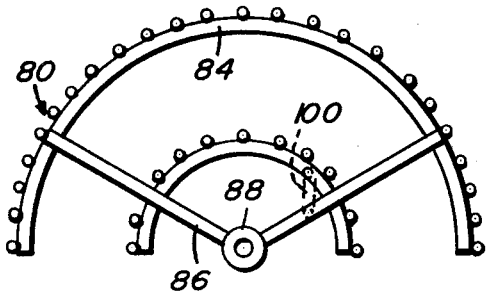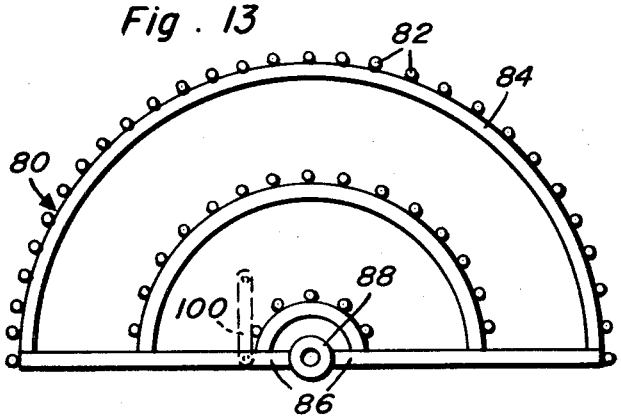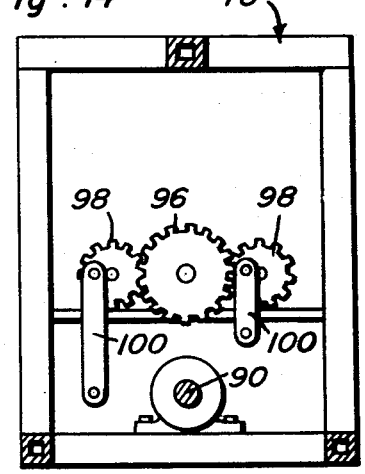

Alfred R. Baker
INVENTOR.

HARVESTING APPARATUS

This is a continuation-in-part of application Ser. No. 735,116, filed June 6, 1968, now U.S. Pat. No. 3,561,205, for Fruit Harvester.

The instant invention is generally concerned with the harvesting of oranges and like fruits, and more particularly relates to harvesting apparatus which effects a severing of the fruit from the tree by means of a snapping of the stems, rather than the more conventional systems which require either a shaking of the tree or a striking of the fruit.

It is a primary object of the instant invention to provide harvesting apparatus which is capable of penetrating deeply into the foliage of a tree and harvesting the mature fruit therefrom in a manner which causes no damage to either the tree or the fruit such as frequently results from more conventional harvesting systems.

In conjunction with the above object, it is a significant object of the instant invention to provide harvesting apparatus which effects the severing of the fruit from the tree by a snapping of the stems with the fruit subsequently being carefully guided along sloping paths to a common gathering point.

Another significant object of the instant invention resides in the provision of a harvester or picker which can be easily mounted on any appropriate vehicle, normally on the end of a manipulable boom so as to provide for a high degree of adjustability and maneuverability, the vehicle normally also incorporating a hydraulic supply system for use as a source of power for the hydraulic motor incorporated into the apparatus of the instant invention.

Likewise, it is an object of the instant invention to provide harvesting apparatus which, while highly unique in construction and operation, is basically a simple unit, easily operated and particularly adapted for field use with a minimum amount of maintenance.

Basically, the harvester or picker comprises a pair of substantially coextensive sections, each incorporating a plurality of projecting rods arranged in rows or layers with those of each section alternating with those of the other section. The sections are reciprocated in opposite directions, that is sequentially outward and inward relative to each other in a synchronized manner. The spacing of the rods is such so as to support the fruit thereon with the rods in the row immediately above a supported fruit effecting the severing of the stem thereof. Once the stem is severed, the fruit gently rolls down an incline defined by the supporting row into a common collection area. The sections can either be rectangular and reciprocated along horizontal paths, or semi-circular and reciprocated along arcuate paths.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a front elevational view of the apparatus;

FIG. 6 is a detail of one corner of the picking head sections at their extreme positions;

FIG. 9 is a side elevational view of another variation of the harvesting apparatus;

Figure 1:
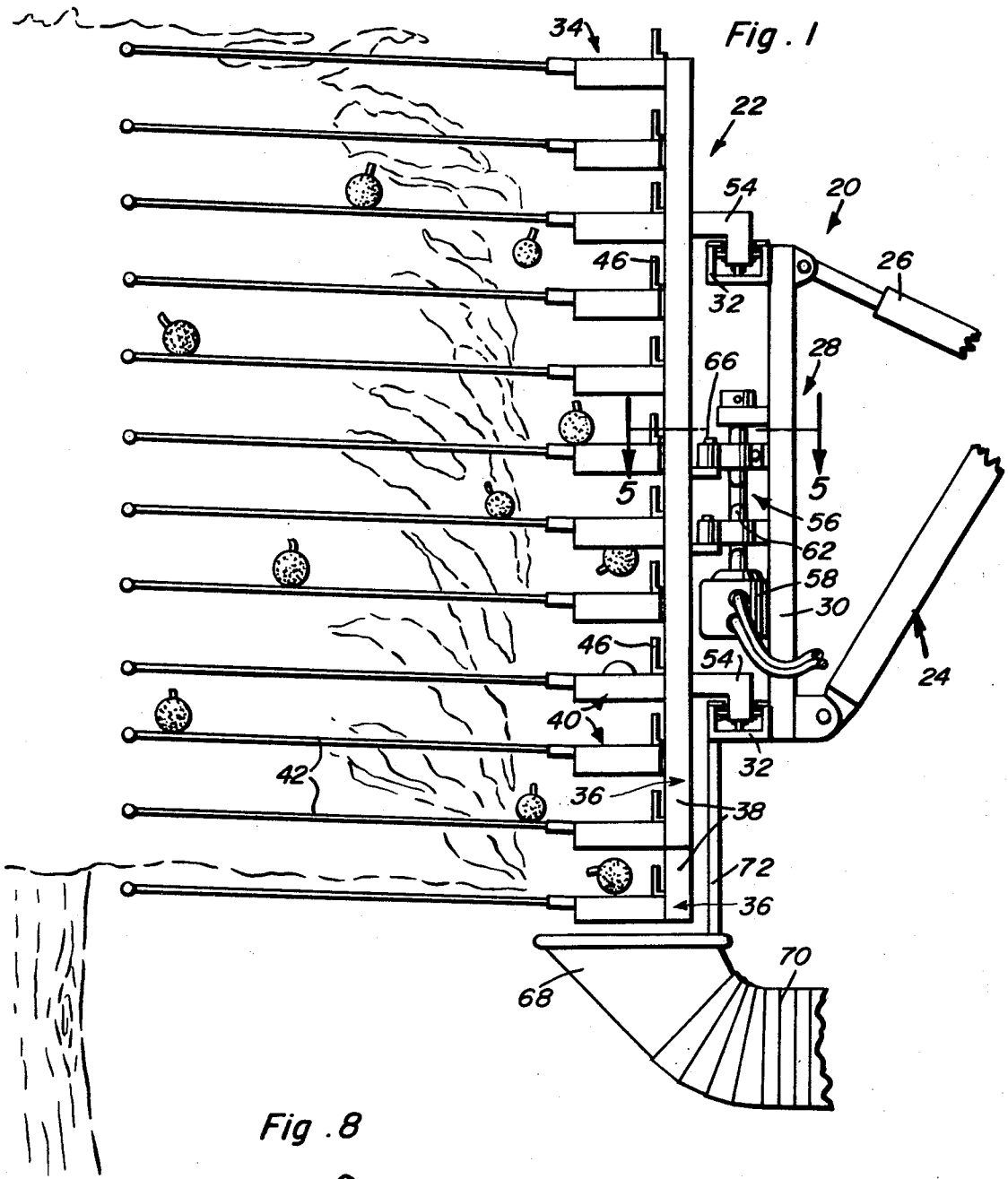
FIG. 1 is a side elevational view of the harvesting apparatus of the instant invention illustrated in fruit severing engagement with a tree.
Figure 8:
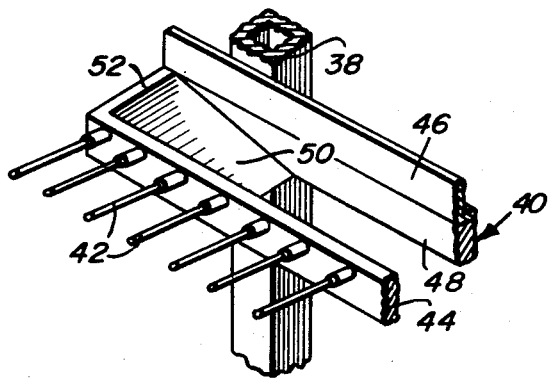
FIG. 8 is a perspective detail of the rod mounting and fruit collecting frames or units.
Figure 3:
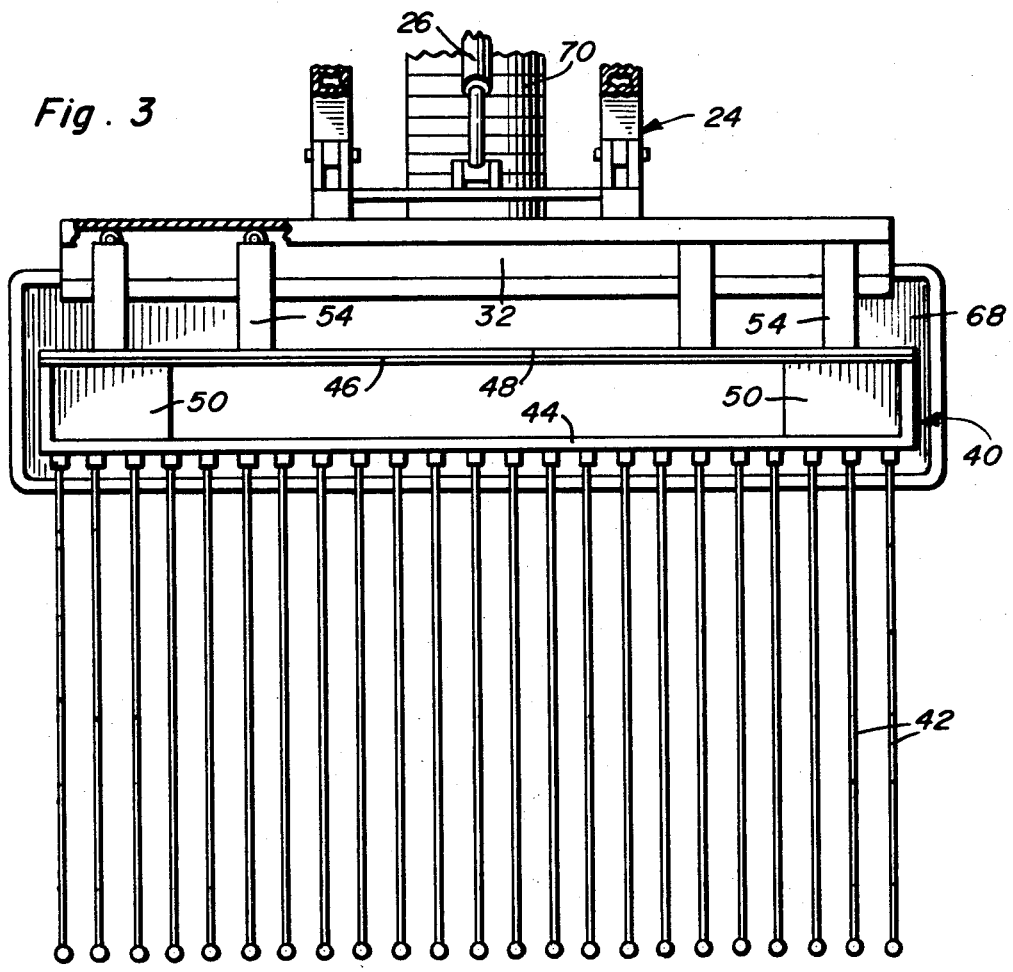
FIG. 3 is a top plan view of the apparatus.
Figure 5:
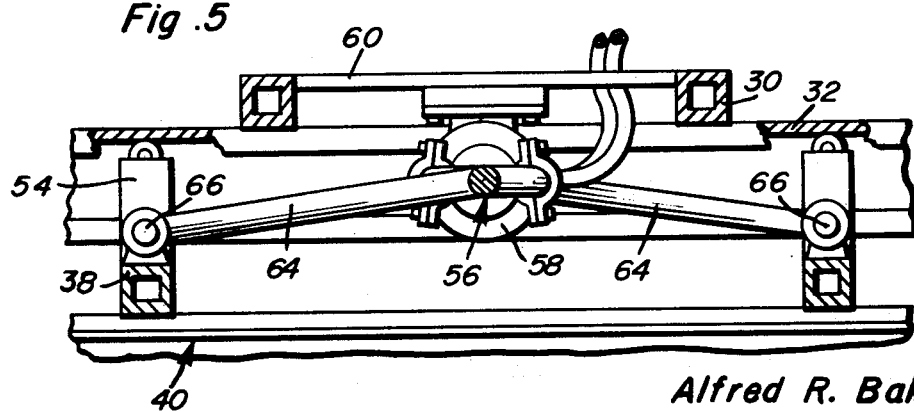
FIG. 5 is a cross-sectional detail taken substantially on a plane passing along line 5—5 in FIG. 1.

FIGS. 12 and 13 constitute elevational views of the two sections which comprise the picking head of the apparatus of FIG. 9; and FIG. 14 illustrates an appropriate drive arrangement for the apparatus of FIG. 9.

Referring now more specifically to the drawings, reference numeral 20 is used to generally designate the harvesting apparatus comprising the instant invention. This apparatus 20 consists basically of a picking unit 22 pivotally mounted on a vehicle mounted boom unit 24 for adjustment relative thereto by appropriate hydraulic units 26, as well as adjustment with the boom itself through the normally provided controls which are conventionally capable of both vertically and horizontally adjusting the boom and any working implement carried thereby.

The picking unit includes a mounting frame 28 by which it is secured to the boom means 24. This mounting frame 28 basically includes a pair of laterally spaced rigid uprights 30 which have upper and lower horizontally extending channel tracks 32 rigidly affixed transversely thereacross and normally extending laterally therebeyond as will be best appreciated from FIG. 4.

The picking head itself, generally designated by reference numeral 34, consists of two sections 36 vertically orientated in coplanar relationship with each other. Each of the sections 36 includes a pair of laterally spaced rigid vertical frame members 38 which in turn mount horizontally orientated forwardly extending rectangular fruit gathering and directing frames 40. As will be appreciated from the drawings, the frames 40 of one section 36 alternate with the frames 40 of the second section 36 and freely overlie the uprights or vertical members 38 thereof for a free sliding movement thereby in a manner which shall be described subsequently.

Each of the section frames 40 has a row of laterally spaced forwardly extending rods or rod-like fingers 42 fixed to and extending forwardly, at a slightly upward inclination, from the upper edge portion of the front beam 44. These rods 42 are spaced so as to preclude the dropping of the fruit therethrough. In other words, the fruit, upon a severing of the stems, will be retained on the row of rods immediately therebelow and, due to the slight inclination of the rods, roll smoothly rearward to the corresponding fruit gathering and directing frame 40. Inasmuch as the rods are to be introduced directly into the foliage of the tree, it is preferable that the forward ends of the fingers or rods 42 be rounded or provided with enlarged ball-like ends so as to avoid damage to the tree or fruit.

Figure 7:
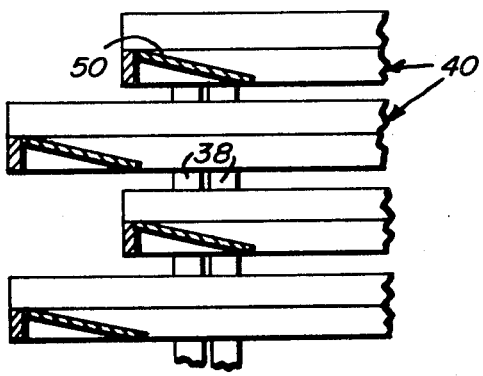
FIG. 7 is a detailed view of portions of the fruit directing baffles at the extreme positions of the sections.
Figure 10:
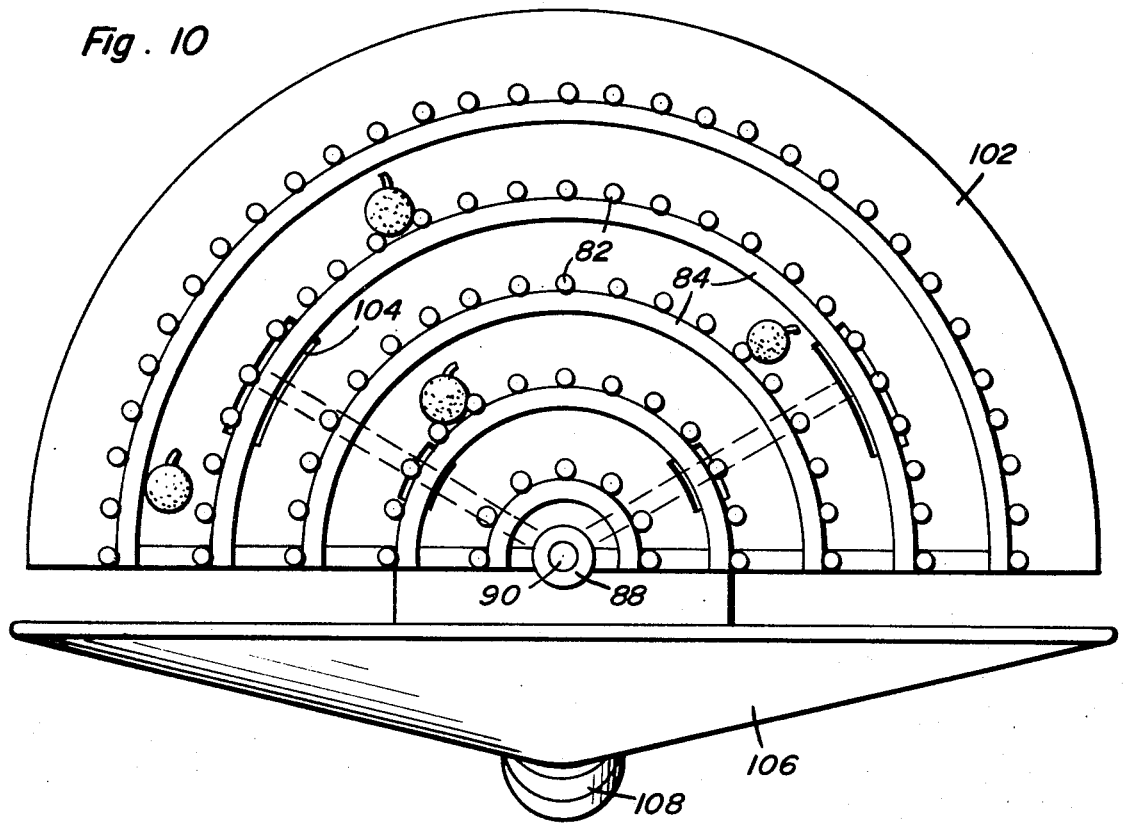
FIG. 10 is a front elevational view of the apparatus of FIG. 9.
Figure 11:
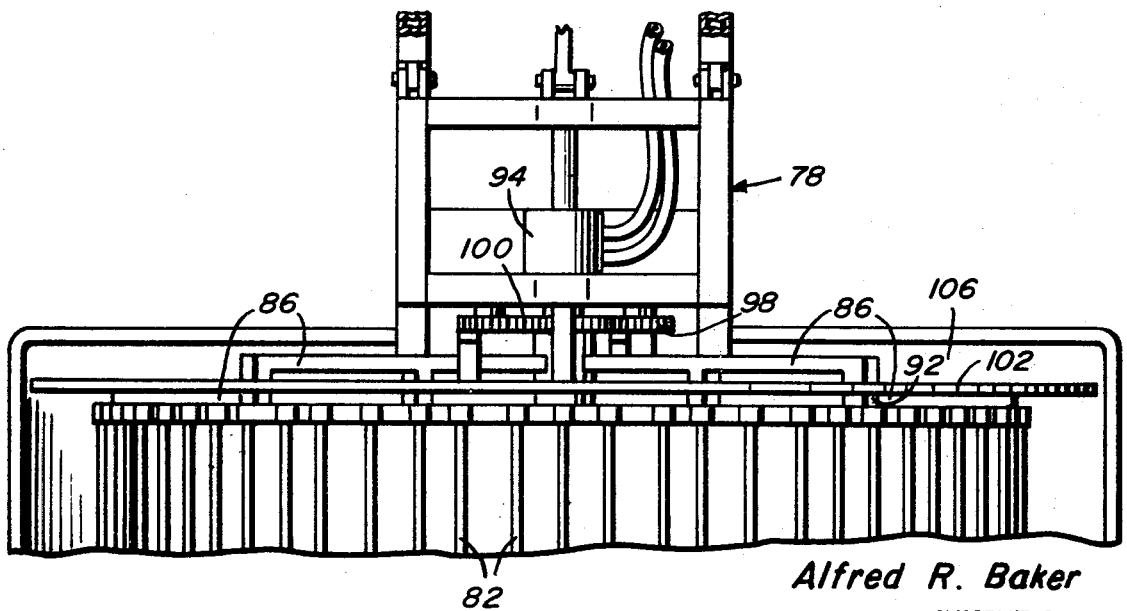
FIG. 11 is a partial top plan view of the apparatus of FIG. 9.

Each of the section gathering and directing frames 40 includes a full length vertical backstop 46 affixed to and extending upward from the rear beam 48 thereof so as to limit the rearward movement of the fruit and ensure a dropping of the fruit vertically through the frame 40. By the same token, the opposite end portions of each of the frames 40 include baffles 50 positioned between the front and rear beams 44 and 48 and inclining laterally inward from the end walls or beams 52 sufficiently so as to ensure a continuous overlap of the inner ends thereof with the interior of the section frame 40 of the other section which will be positioned immediately therebelow due to the alternate arrangement of the fruit gathering components of the apparatus. This feature is illustrated in FIG. 7 wherein the two sections 36 are at their extreme positions.

Each of the sections 36 is mounted for sliding movement longitudinally along the upper and lower tracks 32 by means of upper and lower rearwardly directed arms 54 which are individually fixed to the corresponding section uprights 38. These arms 54 terminate in portions, normally downwardly directed, which are received within the tracks 32 and retained therein for movement therealong. This movement can be effected, as an example, by track engaging rollers mounted on the downturned arm portions, or alternatively, by support rollers affixed to the tracks and defining rolling surfaces along which the arms, and hence the sections, can travel. In any case, regardless of the particular rolling or sliding engagement provided, the tracks are to function both as a guide for the lateral reciprocation of the sections 36, and as a positive support for the two sections, retaining the sections vertically orientated and in operative position for manipulation through a manipulation of the supporting boom unit and/or mounting frame 28.

The reciprocal driving or moving of the picking head sections 36 sequentially outward and inward relative to each other is effected through the utilization of a crankshaft 56 rotatably driven from an appropriate motor 58, normally hydraulic and controlled from the propelling vehicle. Both the shaft 56 and the motor 58 are vertically orientated and mounted on appropriate mounting plates 60 affixed to and extending transversely between the mounting frame uprights 30. The crankshaft 56 includes a pair of oppositely directed crank portions 62, each of which is engaged with one of the picking head sections 36 through an elongated rigid throw rod 64 pivotally connected at one end to the corresponding crank 62 and pivotally connected at the second end to a short shaft portion 66 rigidly affixed to the corresponding section 36. Thus, as the crankshaft 56 is rotatably driven by the motor 58, the two sections 36 will sequentially move away from and toward each other. This in turn will provide the desired reciprocation of the fruit severing rods 42.

It is contemplated that the movement of the rods be such so as to effect the severing of the stems of mature fruit, while at the same time not being sufficient so as to sever the relatively stronger stems of the green or young fruit, the gentle nature of the apparatus in operation effecting the desired harvesting of the mature fruit while not affecting the younger fruit. In this manner, subsequent crops are not affected and can be effectively harvested in turn.

As previously indicated, the spacing of the rods 42 in each of the rows is to be such so as to retain the severed fruit thereon with the inclination of the rods directing the fruit rearwardly to the fruit gathering and directing frames 40. In this manner, there is no damage to the fruit such as might occur were the fruit to fall vertically through the series of reciprocating rods. Once the fruit reaches the frames 40, the fruit is vertically directed therein by the end baffles 50 so as to fall freely therethrough to an underlying collecting pan 68 which funnels the fruit to a discharge tube or the like 70 for collection at a remote point in any appropriate manner. If so desired, the fruit gathering and directing frames 40 can be appropriately padded so as to further minimize any possibility of damage to the fruit.

With reference to FIGS. 2 and 6, it should be noted that these figures illustrate the two extreme positions of the picking head sections 36 relative to each other with FIG. 7 illustrating the overlapping nature of the baffles 50 in the extended positions of the sections 36. These baffles are particularly significant in ensuring a centrally directing of the fruit for a movement thereof through the vertically aligned frames 40 notwithstanding the lateral extension of the alternating frames relative to each other.

As previously indicated, the harvester of the instant invention, while particularly adapted for use in the harvesting of oranges, can be utilized in harvesting other fruits which are similarly tree grown. The only adjustments in the apparatus would be in the spacing of the rods so as to retain and rollingly support the particular fruit and possibly in the distance and speed of reciprocation of the rods so as to effect the desired preferably severing of only the stems of the mature fruit.

Figure 4:
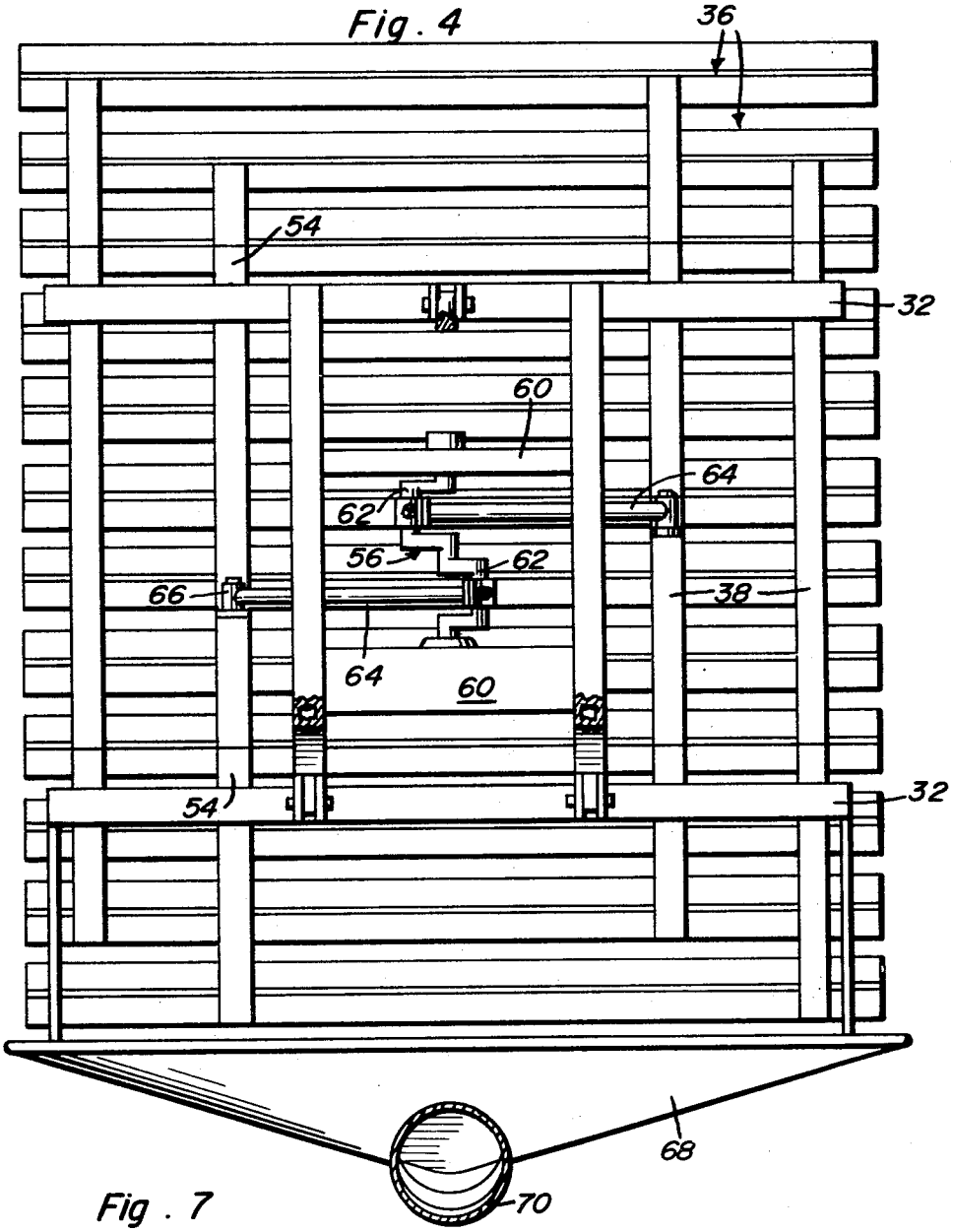
FIG. 4 is a rear elevational view of the apparatus.

Incidentally, while not mentioned supra, it will be noted, particularly from FIGS. 1 and 4, that the underlying gathering tray 68 is also supported from the mounting frame 28 by means, as one example, of rigid vertical members 72 extending between the rear portions of the tray 68 and the lower track 32.

Attention is now specifically directed to FIGS. 9 through 14 wherein a variation of the picking unit has been illustrated. This picking unit is generally designated by reference numeral 74 and likewise includes a picking unit 76 and a mounting frame 78.

The picking head 76 is of a generally semi-cylindrical configuration with the two sections 80 including rows of rods 82 which follow an arcuate or semi-circular path. As with the initially described form of the invention, the rows of the sections 80 alternate with each other and are generally coextensive. The rods 82 in each row are affixed to and project forwardly from an arcuate rigid beam 84 with the beams 84 of each section being interconnected in concentric relation to each other by a pair of rigid frame members 86. The frame members 86 of each section 80 extend from a central hub 88. As will be appreciated from a comparison of the two sections, shown in FIGS. 12 and 13, the frame members 86 of one section are orientated at 180 degrees to each other while the frame members 86 of the second section 80 are orientated at a lesser angle so as to enable a relative rotation of the sections 80 without interference therebetween. The hubs 88 are mounted on a common shaft 90 for free rotation of the sections 80 thereabout, the shaft 90 being affixed to the mounting frame 78 and projecting horizontally thereon. In order to accommodate both hubs, it will be noted that the frame members or arms 86 of the section 80 of FIG. 12 are offset rearwardly of the row beams 84 and affixed thereto by forwardly extending short supporting and connecting portions 92.

The reciprocal driving of the sections 80 in opposite directions from each other is effected by means of an appropriate motor 94 horizontally orientated on the mounting frame 78 and normally hydraulic in nature. The forwardly projecting drive shaft of the motor 94 mounts a drive gear 96 which meshes with and drives a pair of driven gears 98 rotatably mounted to the opposite sides thereof. Each of the driven gears 98 is in turn connected to one of the arm-like members 86 of one of the sections 80 by means of a throw rod or link 100 pivotally connected to the gear 98 radially outward from the center of rotation and pivotally connected to the associated member 86. The connection of the links 100 is such so as to, upon a rotational driving of the driven gears 98, effect an alternating rotation of the sections about the mounting shaft 90 which receives the section hubs 88. As previously indicated, the sections move in opposite directions so as to effect a synchronized oppositely directed moving of the arcuate rows of rods 82.

Positioned immediately behind the two sections is an enlarged arcuate shield 102 which assists in retaining the severed fruit forward of the mounting frame 78. This shield 102, as will be appreciated from FIG. 10, has appropriate arcuate slots or openings 104 therein for the accommodation of the forwardly projecting portions 92 of the frame members 86 to accommodate the rotational travel thereof.

As was the case with the initially described rods, the rods 82 are so spaced as to preclude the passing of the severed fruit therethrough. The fruit, upon being severed, engages the next lower arcuate row of rods 82 and moves along the arcuate path defined thereby to the end of the row, at which point the fruit drops a short distance to an underlying enlarged gathering tray 106 which directs the fruit to an appropriate discharge chute 108. As will be appreciated, the speed and degree of travel of the section rows is such so as to provide for a severing of the matured fruit, through a snapping of the stems, while leaving the green or unmatured fruit for harvesting at a later date. Once the fruit is severed, rather than falling through and being damaged by the reciprocating rods, the fruit is gently tumbled or moved along the arcuate paths to a discharge point immediately above the gathering tray 106.

In the use of either form of harvester, the picking head is elevated to the desired height and introduced laterally into the tree for a slight initial penetration. When positioned in this manner, the encountered fruit will be hanging freely between the rows of rods or possibly selectively resting on various ones of the rows with the stems, in either instance, falling within the rows immediately thereabove. The sections are then reciprocally driven for a few seconds, such being considered sufficient so as to snap the stems of the mature fruit. Once severed, the fruit, on the rows immediately therebeneath, moves to the gathering or collection point, either the rearwardly located frames 40, as is the case with the first construction described, or along the arcuate paths to the gathering tray as with the second variation described. After the initial fall of fruit, the picking head is projected further into the tree and the process continued. As will be appreciated, a relatively large area of the tree can be accommodated by the picking head with the severed fruit being gently guided to the disposal point, rather than having to haphazardly fall out of the tree or through the picking head itself such as could adversely affect the quality of the fruit. The mounting of the apparatus on a boom of course provides a substantial degree of maneuverability and a capability of being introduced into a tree at substantially any desired angle. It is contemplated that each section include multiple rows of rods, the initially described form of the invention having, depending upon the particular type of fruit being harvested, at least as many as fifteen rows of alternately oppositely moving rods. The arcuate form of the apparatus, while normally having fewer rods, can, as previously indicated, also incorporate several rows. Notwithstanding the multiple rows of rods provided, and the fact that the fruit is severed by a snapping of the stems through a reciprocating movement of the rods, the fruit is gently guided and gathered at a collection point.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fruit harvester comprising a rigid mounting frame, a pair of generally vertical adjacent picking head sections, means mounting said picking head sections on said frame for reciprocal movement relative to each other and to said frame, means for reciprocally moving said head sections in synchronization, each of said picking head sections including several spaced rows of generally horizontal picking rods, said picking rods projecting for picking engagement with fruit stems upon a movement of the head sections, the rows of rods of each head section alternating with the rows of rods on the other head section and extending in generally free overlying relation to the other head section between the rows thereof, said rods in each row being closely adjacent each other and precluding passage of the fruit transversely therethrough, the severed fruit moving to a collecting area over the rods of each row.

2. In fruit harvesting apparatus, multiple spaced rows of parallel laterally spaced picking rods, means for reciprocally moving at least alternate ones of said rows so as to effect a lateral movement of the rods therein and a stem snapping engagement with encountered fruit stems, said rods attached to the moving means at a one end, each row of rods accommodating the fruit stems therethrough while precluding passage of severed fruit, the rods in said rows being orientated so as to effect movement of severed fruit therealong, the rods in each row having common collecting means at ends thereof at said one end thereof, the collecting means of all of the rods of each row being generally vertically aligned for passage of the fruit vertically therethrough.

3. In fruit harvesting apparatus, multiple spaced rows of parallel laterally spaced picking rods, means for reciprocally moving at least alternate ones of said rows so as to effect a lateral movement of the rods therein and a stem snapping engagement with encountered fruit stems, each row of rods accommodating the fruit stems therethrough while precluding passage of severed fruit, the rods in said rows being orientated so as to effect movement of severed fruit therealong, said rows being straight and generally horizontal, the rods in each row being substantially coplanar and inclined slightly downward from first ends thereof to the second ends thereof, and the rods of each row having common collecting means at the second ends thereof, the collecting means of all of the rods of each row being generally vertically aligned for passage of the fruit vertically therethrough.

4. The apparatus of claim 3 wherein the adjacent rows are moved in opposite directions.

5. The apparatus of claim 4 wherein the collecting means of all of the rows are maintained in fruit passing alignment throughout the range of movement of the rows.

6. The apparatus of claim 5 wherein each collecting means includes centrally directed baffles at the opposite ends thereof for a central directing of the fruit received thereby.

7. In fruit harvesting apparatus, multiple rods, said rods being in vertical and horizontal spaced relation to each other and arranged in a pair of sections, means for oppositely moving said sections with respect to one another and laterally of the length of the rods for effecting a stem snapping engagement with encountered fruit stems, said rods defining fruit retaining means for moving the severed fruit to a collecting area, the rods being arranged in rows, and said rows being arcuate and generally concentrically arranged, the rods of each row extending generally horizontal with each row being at its maximum height at the center thereof with the opposed ends thereof being lower whereby severed fruit will move to the opposite ends of the rows.

8. The apparatus of claim 7 including fruit collecting means underlying the opposed ends of the rows.

* * * * *